United States Patent
Kita

(10) Patent No.: US 7,643,696 B2
(45) Date of Patent: Jan. 5, 2010

(54) IMAGE PROCESSING METHOD AND PROGRAM FOR RESTRICTING GRANULAR NOISE AND MODULE FOR IMPLEMENTING THE METHOD

(75) Inventor: Koji Kita, Iwade (JP)

(73) Assignee: Noritsu Koki Co., Ltd., Wakayama-Shi (JP)

( * ) Notice: Subject to any disclaimer, the term of this patent is extended or adjusted under 35 U.S.C. 154(b) by 664 days.

(21) Appl. No.: 11/409,204

(22) Filed: Apr. 21, 2006

(65) Prior Publication Data

US 2006/0245002 A1 Nov. 2, 2006

(30) Foreign Application Priority Data

Apr. 21, 2005 (JP) .............................. 2005-123770

(51) Int. Cl.
  *G06K 9/40* (2006.01)
  *H04N 1/409* (2006.01)
(52) U.S. Cl. ...................................... 382/260; 358/3.26
(58) Field of Classification Search ................. 382/260, 382/262, 268, 269, 275, 205; 358/3.26, 3.27, 358/447, 448, 463
See application file for complete search history.

(56) References Cited

U.S. PATENT DOCUMENTS 4,794,531 A * 12/1988 Morishita et al. ........... 382/132
5,883,983 A * 3/1999 Lee et al. .................... 382/268
6,347,161 B1 * 2/2002 Mancuso ..................... 382/261
2008/0075344 A1 * 3/2008 Nambu et al. ............... 382/131

FOREIGN PATENT DOCUMENTS

| JP | 2002-044473 | 2/2002 |
| JP | 2003-132352 | 5/2003 |

* cited by examiner

*Primary Examiner*—Yon Couso
(74) *Attorney, Agent, or Firm*—Fulbright & Jaworski LLP

(57) ABSTRACT

An image processing module restricts granular noise present in photographic image data obtained by digitization of an image by utilizing a weighted average filtering operation. The module comprises a target pixel setting section, a difference value calculation section, a weight coefficient determining section and a filtering operating section. The target pixel setting section sets one target pixel after another from a group of pixels together constituting the photographic image data. The difference value calculating section calculates a difference value between a pixel value of the target pixel and each peripheral pixel present within a calculating area centering about the target pixel and is used for the weighted average filtering operation. The weight coefficient determining section determines a weight coefficient for use in the weighted average filtering operation, in accordance with the difference value. The filtering operating section obtains a corrected pixel value for the target pixel by effecting the weighted average filtering operation with the weight coefficient.

12 Claims, 8 Drawing Sheets

Fig.4 calculation matrix

| S1 | S2 | S3 |
|----|----|----|
| S4 | S5 | S6 |
| S7 | S8 | S9 | target pixel

Fig.5 difference value matrix

| Δd1 | Δd2 | Δd3 |
|-----|-----|-----|
| Δd4 | Δd5 | Δd6 |
| Δd7 | Δd8 | Δd9 |

$\begin{cases} \Delta d1 = |S5-S1| \\ \vdots \\ \Delta d9 = |S5-S9| \end{cases}$

Fig.6 weight coefficient matrix

| W1 | W2 | W3 |
|----|----|----|
| W4 | W5 | W6 |
| W7 | W8 | W9 |

$\begin{cases} W1 = f(\Delta d1) \\ \vdots \\ W9 = f(\Delta d9) \end{cases}$

IMAGE PROCESSING METHOD AND PROGRAM FOR RESTRICTING GRANULAR NOISE AND MODULE FOR IMPLEMENTING THE METHOD

BACKGROUND OF THE INVENTION

1. Field of the Invention

The present invention relates to a technique for restricting noise in image data. More particularly, the invention relates to a technique for restricting granular noise present in photographic image data obtained by digitization of an image, in particular, such data obtained by a film scanner.

2. Description of Related Art

Generally, a standard photographic film has a grain (pixel) density on the order of 2500 dpi. The commonly employed 135 F sized photographic film has a photographic image area of: 36 mm×24 mm. Hence, its photographic image has total of 3445×2362 pixels (grains). On the other hand, a film scanner employed in the most recent digital image printing system referred to as "digital mini-lab" has an image resolution exceeding 2000 dpi. This means that the film scanner can input a photographic image from the photographic film with a resolution substantially equal to that of the film. Hence, the printing system using such scanner can make a print which reproduces a photographic image with substantially same image resolution as that of the original, i.e. the film. For quality improvement of the photographic image, it is needed to effect a so-called sharpness enhancing operation for enhancing the contour in the photographic image. However, if this sharpness enhancing operation is effected on photographic image data obtained by such high-quality film scanner with the grain (pixel) level resolution equivalent to that of the photographic negative, the operation enhances not only the photographic image contour, but also graininess of the grains of the photographic film, thus resulting in unsightly image, depending on the image characteristics of the photographic image. Such enhanced graininess leading to unsightly image is referred to herein as "granular noise." The granular noise, especially if present in a human skin area, is a significant disadvantage to the photographic image quality. To reduce such granular noise, a blurring (smoothing) operation will be effected. This operation results, however, in blurring of the contour, in addition to granular noise reduction, thus compromising the effect of the sharpness enhancing operation effected previously.

As a solution to the above problem, there is known a technique (from e.g. Japanese Patent Application "Kokai" No. 2003-132352 (see its "Abstract" and FIG. 1)), comprising the steps of: obtaining from image data sharpened image data with enhancement of each pixel of the data; obtaining also from the image data smoothed image data with smoothing of each pixel of the data; setting a sharpness-mixing ratio correlation such that the mixing ratio of the smoothed image data will be increased for a most frequently occurring value of sharpness calculated for each pixel of the image data and obtaining corrected data for the image data by mixing the sharpened image data and the smoothed image data for each pixel in accordance with the sharpness-mixing ratio correlation. Namely, in this technique, sharpness of the image is detected and then, based on this detected sharpness, the sharpening operation and the smoothing operation are effected selectively. However, as it is difficult to determine the mixing ratio between the sharpening operation and the smoothing operation, this technique has not fully solved the problem.

As a different solution, another technique is known (from e.g. Japanese Patent Application "Kokai" No. 2002-44473 (paragraphs [0024]-[0028] and FIG. 1)). In this technique, source image data is separated between density data and color data; then a ratio between a smoothing operation for color data and a smoothing operation for density data is varied in accordance with variation of the density data in two-dimensional coordinate space. In doing so, in view of the fact that the data relating to a contour of the image is contained more in the density data than in the color image data, as the image data moves from a flat (even) area of the image toward a contour area of the same, a ratio of density noise removal is progressively decreased to '0' (zero) and also the density noise removing operation is terminated earlier than the color noise removing operation. In essence, this technique effects the smoothing operation selectively on a flat area of the image. If a conventional sharpness enhancing operation is effected thereafter as a post operation, it is possible to obtain enhanced sharpness at the image contour with certain restriction of granular noise. However, the contour line has a certain width due to inaccurate focus or a shade, the above technique will result in weak smoothing on the contour line per se and/or its periphery. Hence, the granular noise will remain at such portion. Further, as the smoothing operation uses a spatial filter of n×n pixels, even if only one pixel included in the calculating area of the spatial filter constitutes the noise, such smoothing operation as above will result in an image in which the effect of the noise pixel is "extended" over to the entire area of the spatial filter. As a result, this technique tends to result in unnecessarily flat (even) image.

SUMMARY OF THE INVENTION

In view of the above-described state of the art, a primary object of the present invention is to provide an image processing technique capable of restricting granular noise not only in a flat area, but also in the contour or its vicinity and capable also of maintaining fine details and texture of the original photography.

For accomplishing the above-noted object, an image processing method for restricting granular noise, according to the present invention, utilizes a weighted average filtering operation. This method comprises setting one target pixel after another from a group of pixels together constituting photographic image data. A difference value between a pixel value of the target pixel and each peripheral pixel present within a calculating area centering about said target pixel is calculated and used for the weighted average filtering operation. A weight coefficient for use in the weighted average filtering operation is determined in accordance with the difference value. A corrected pixel value for the target pixel is obtained by effecting the weighted average filtering operation with using the weight coefficient.

With this method, the weighted average value, which is the operator of a weighted average filter employed in the weighted average filtering operation, is not a fixed value. Rather, the weight coefficient is determined in accordance with a difference value which is the difference between the pixel value of the peripheral pixel corresponding to the position of each operator and the pixel value of the target pixel. Hence, a peripheral pixel having a pixel value of a predetermined relationship relative to the pixel value and its magnitude of the target pixel will exert a greater influence on the new corrected pixel value of the target pixel than the other peripheral pixels. Between the case of the target pixel being located in a flat area and the further case of the target pixel being located in a contour area, there exists a predetermined relationship between the pixel value of the target pixel and the pixel value of the peripheral pixel. Hence, by setting such weight coefficient which can exert a greater influence for a predetermined difference value, one can restrict the granular noise (graininess restriction) not only in a flat area, but also in the contour or its vicinity to maintain fine details and texture of the original photography.

Regarding the graininess restriction of photographic image data based on a photographic operation, if the weight coefficient has a defined range of 0 to 1, then, according to the present inventor's finding obtained through experiments, it has been found advantageous to set the weight coefficient from such a group of values to 1 when the difference value is 0. When the difference value has an absolute value greater than a predetermined value, the weight coefficient is set to 0. When the difference value is greater than 0 and smaller than said threshold value, the weight coefficient is set to decrease monotonously from 1 with increasing in the absolute value of the difference value and then increase monotonously to 1. As a preferred mathematical formulation for use in such determination of the weight coefficient according to the difference value, the following relation equation is proposed.

$$W=(|\Delta d|/SH)^n$$

where, $n \geq 1$, W is a weight coefficient, $\Delta d$ is a difference value and SH is a threshold value. For 8-bit image data obtained from a standard photographic image, preferably, the threshold value is set as 16 and n=15. In any case, if the weighted average filter having the weight coefficient determined by the relation equation is applied to the photographic image data, for its each color component image data in the case of color image data, one can obtain corrected image data with granular noise sufficiently restricted not only in its flat area but also its contour area and with the fine details and texture of the original photograph being effectively maintained. Incidentally, as to the size of the weighted average filter, the size between 5×5 to 13×13 is preferred and the specific size should be appropriately determined, depending on the size of the image data to be processed and/or the processing speed of the processing apparatus.

With the determination of the weight coefficient based on the difference value as described herein, the weight coefficient is set to 0 for a peripheral pixel having a difference value grater than the threshold value. Therefore, the threshold value has great importance. Preferably, the threshold value is obtained empirically and/or experimentally from image characteristics of the photographic image. In accordance with an embodiment of the present invention, methods for automatically setting the threshold value include a method for calculating the threshold value based on statistical characteristics value of all pixel values of the photographic image data and a method comprising the steps of dividing the photographic image data into a plurality of pixel areas and calculating the threshold value for each pixel area based on statistical characteristics value of pixel values of this pixel area, so that a different threshold value can be employed for each pixel area including the target pixel. Alternatively, an operator, preferably an experienced operator, can freely set the value in accordance with an embodiment of the present invention. When the operation is carried out by an inexperienced operator, the threshold value can be fixed to an appropriate value in advance.

The present invention comprises also a program for causing a computer to execute the image processing method for granular noise restriction, as described herein, and a medium storing such program therein.

Furthermore, the present invention comprises a granular noise restricting module for implementing the image processing method for granular noise restriction, as described herein.

The granular noise restricting module comprises a target pixel setting section, a difference value calculating section, a weight coefficient determining section and a filtering operating section. The target pixel setting section sets one target pixel after another from a group of pixels together constituting photographic image data. The difference value calculating section calculates a difference value between a pixel value of the target pixel and each peripheral pixel present within a calculating area centering about the target pixel. The difference value is used in the weighted average filtering operation. The weight coefficient determining section determines a weight coefficient for use in the weighted average filtering operation, in accordance with the difference value. The filtering operating section obtains a corrected pixel value for the target pixel by effecting the weighted average filtering operation using the weight coefficient.

It is appreciated that the granular noise restricting module of the present invention achieves all the functions and effects of the image processing method described herein. Additionally, granular noise restricting module can incorporate features of various image processing methods described herein.

In accordance with an embodiment of the present invention, the module granular noise restricting module further comprises a lookup table from which each weight coefficient can be extracted as a feature of the difference value, so as to simplify and speedup the operation of determining an appropriate weight coefficient.

In accordance with an embodiment of the present invention, the lookup table comprise a group of values that when the difference value is 0, the weight coefficient is set to 1; the weight coefficient is set to 0 when said difference value has an absolute value greater than a predetermined or threshold value; the weight coefficient is set to decrease monotonously from 1 with increasing absolute value of said difference value and then increase monotonously to 1 when the difference value is greater than 0 and smaller than the threshold value.

In accordance with an embodiment of the present invention, a computer readable media comprises a code for restricting granular noise present in photographic image data. The code comprises instructions for setting one target pixel after another from a group of pixels together constituting photographic image data obtained by digitization of an image by a weight filing operation, calculating a difference value between a pixel value of the target pixel and each peripheral pixel present within a calculating area centering about the target pixel and used for the weighted average filtering operation; determining a weight coefficient for use in the weighted average filtering operation in accordance with the difference value and obtaining a correct pixel value for the target pixel by effecting the weighted average filtering operation with the weight coefficient.

Various other objects, advantages and features of the present invention will become readily apparent from the ensuing detailed description and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which:

FIG. 4 is an explanatory view for illustrating a matrix area to be calculated by a weighted average filtering calculation;

FIG. 5 is an explanatory view illustrating a difference value matrix;

FIG. 6 is an explanatory view illustrating a weight coefficient matrix;

DETAILED DESCRIPTION OF THE EMBODIMENTS

Figure 1:
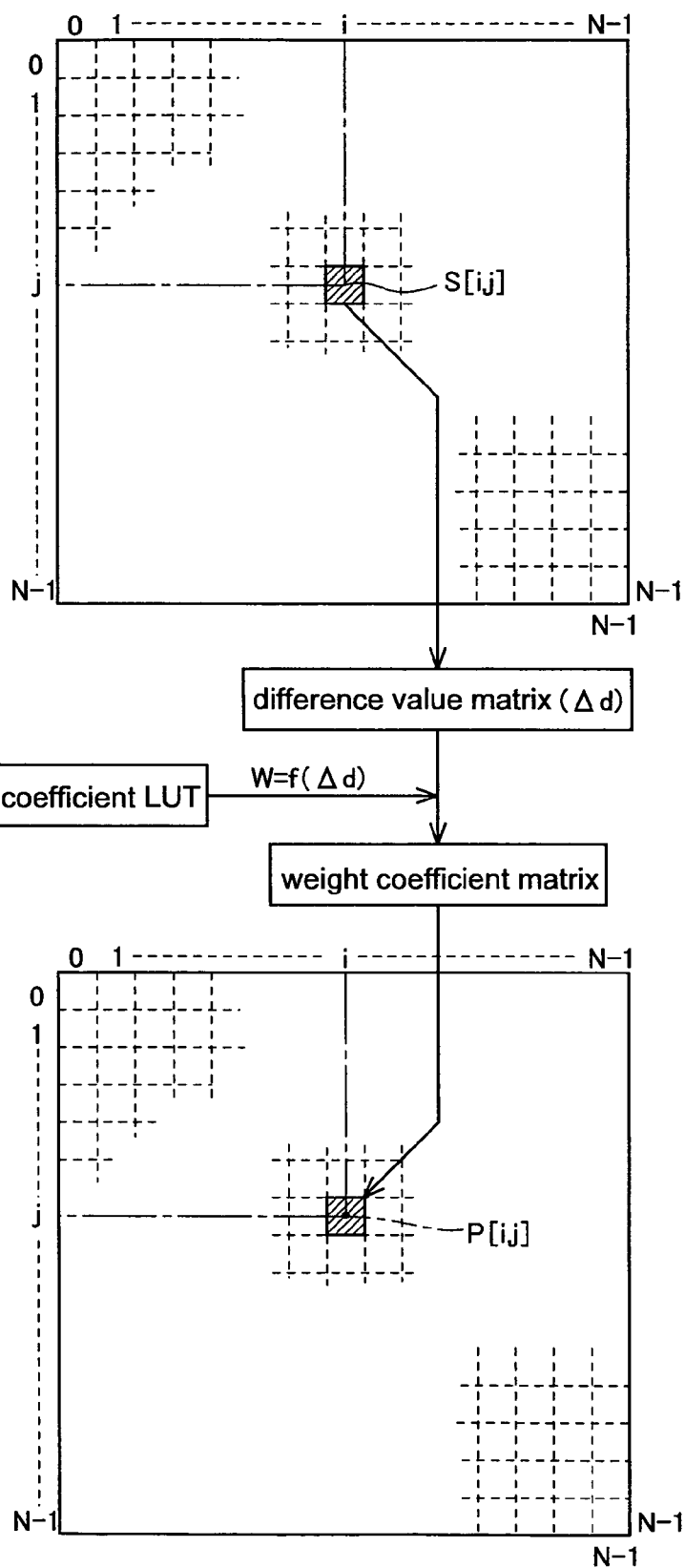
FIG. 1 is an explanatory view for schematically illustrating a granular noise restricting technique in accordance with an embodiment to the present invention.

FIG. 1 shows a basic principle of an image processing technique of the present invention for restricting granular noise by means of a weighted average filtering operation. For simplicity of explanation, a 3×3 weighted average filter is exemplary employed for this weighted average filtering operation. With this weighted average filter, a group of "peripheral pixels" adjacent a target pixel (i.e. a pixel to be corrected) and including this target pixel per se are set as pixels for calculation ("calculation pixels") (for the purpose of matrix calculation, it is assumed that the peripheral pixels to be processed include the target pixel per se). A result of calculation obtained by effecting a weighted average calculation using weight coefficients given for the respective calculation pixels is used as a corrected pixel value for the target pixel. As used herein, the group of calculation pixels is referred to as "a calculation area". The technique of the present invention is characterized in that the weight coefficient allocated to each calculation pixel located within the calculation area is determined according to a difference value between a pixel value of the target pixel and a pixel value of each calculation pixel (i.e. peripheral pixel). More particularly, where the original image is a photographic image having density difference between adjacent pixels, one can sense such density difference either as "a noise" or "a part of the photographic subject image". In this regard, according to the present inventor's finding, the possibility of one's sensing it as "a part of the photographic subject image" rather than as "a noise" increases in a parabolic manner from a very small difference to a predetermined difference (about from 1 to 30, preferably from 1 to 20, in the case of an 8-bit image) and beyond this predetermined difference, one will almost certainly sense it as "a part of the photographic subject image." Taking this finding into consideration, in accordance with an embodiment of the present invention, there is employed a weight coefficient determining function to be described herein.

Figure 2:
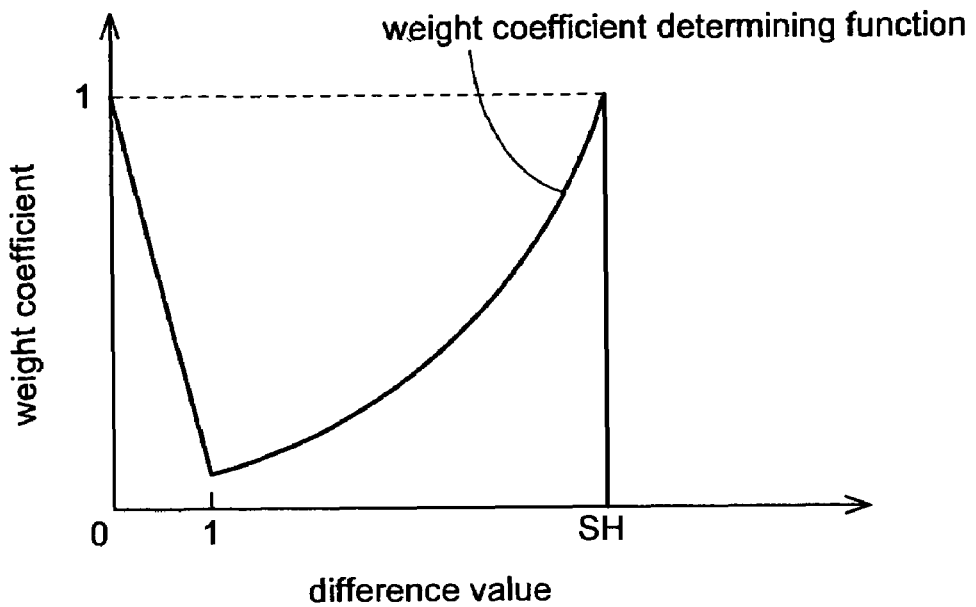
FIG. 2 is a schematic showing a weight coefficient determining function.
Figure 3:
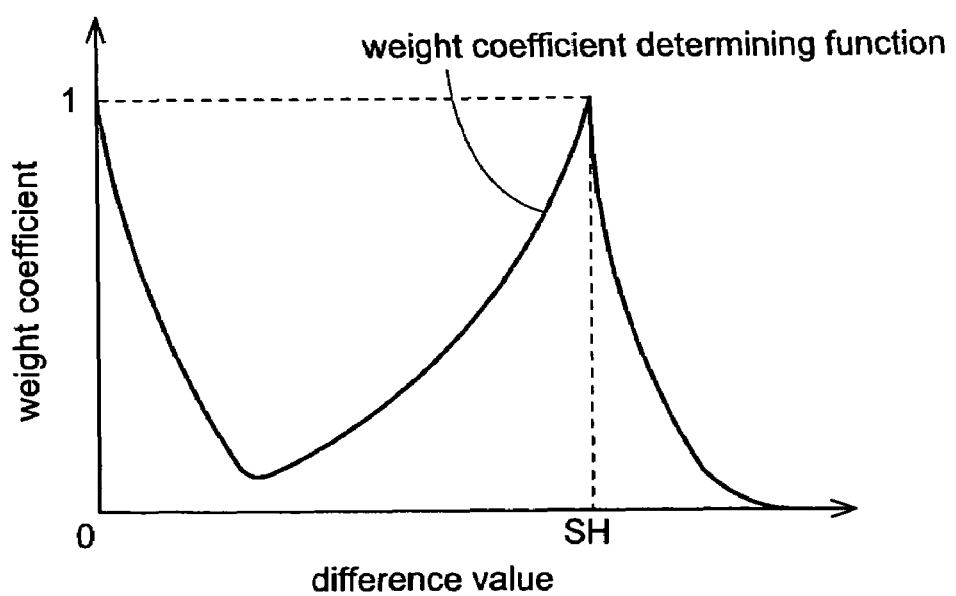
FIG. 3 is a schematic illustrating a further weight coefficient determining function.

The weight coefficient determining function of the present invention obtains a weight coefficient with using a difference value between a pixel value of a target pixel and a pixel value of a peripheral pixel, as illustrated in FIG. 2. That is, the weight coefficient has a defined range: 0~1. As shown in FIG. 2, the weight coefficient determining function determines the weight coefficient from a group of values that when the difference value is 0, the weight coefficient is set to 1; when the difference value has an absolute value greater than a predetermined value (referred to as "threshold value: SH"), the weight coefficient is set to 0; and when the difference value is greater than 0 and smaller than the threshold value, the weight coefficient is set to decrease monotonously from 1 with increasing absolute value of the difference value and then increase monotonously to 1. In the weight coefficient determining function of FIG. 2, the weight coefficient of 0 is obtained when the difference value has an absolute value greater than the threshold value. FIG. 3 shows another weight coefficient determining function in accordance with an embodiment of the present invention, which decreases monotonously with a steeper slope to 0. The difference value ranges from 0 to the threshold value, the coefficient has the minimum value not when the difference value is 1, but when the difference value is greater than 1. Alternatively, the determining function can comprise characteristics of these two functions together in combination. The weight coefficient determining function can be appropriately selected, depending on the resolution when the photographic image data is inputted and/or the film type, that is, on the size of the grains on the photographic image data. Further, the function can be selected depending on the type of the photographic subject and/or the type of the photographic scene.

Turning to FIG. 1, once a target pixel has been set, an exemplary 3×3 calculation matrix area (calculation area) centering about this target pixel is set for the image data as shown in FIG. 4. In the calculation matrix data shown in FIG. 4, S5 represents the pixel value of the target pixel and S1-S4 and S6-S9 represent pixel values of the peripheral pixels located around the target pixel. From this, a 3×3 difference value matrix such as shown in FIG. 5 can be obtained. Each element $\Delta d1 \ldots \Delta d9$ of the difference value matrix can be obtained as follows:

$\Delta d1 = |S5 - S1|$ $\Delta d2 = |S5 - S2|$

. . .

$\Delta d8 = |S5 - S8|$ $\Delta d9 = |S5 - S9|.$

Then, by applying the weight coefficient determining function, as exemplary shown in FIG. 2, to the calculated difference value matrix, a 3×3 weight coefficient matrix is obtained, which is the operator for a weighted average filter as shown in FIG. 6. Each element W1 . . . W9 of the weight coefficient matrix is obtained as follows, with "f" being the weight coefficient determining function.

$$W_* = f(\Delta d_*)$$

where * is a subscript for specifying each element.

To generalize the above, if the original image data is given as: (N−1)×(N−1), the corrected pixel value of the target pixel after this weighted average filtering calculation can be represented by the following formula (1):

$$P[i,j] = \frac{\begin{pmatrix} W[-1,-1]\cdot S[i-1,j-1] + W[0,-1]\cdot \\ S[i,j-1] + W[1,-1]\cdot S[i+1,j-1] + \\ W[-1,0]\cdot S[i-1,j] + W[0,0]\cdot S[i,j] + \\ W[1,0]\cdot S[i+1,j] + W[-1,1]\cdot \\ S[i-1,j+1] + W[0,1]\cdot S[i,j+1] + \\ W[1,1]\cdot S[i+1,j+1]) \end{pmatrix}}{(W[-1,-1] + \ldots + W[1,1])}$$ [formula 1]

$$= \frac{\sum_{m=-1}^{1}\sum_{k=-1}^{1} W[k,m]\cdot S[i+k,j+m]}{\sum_{m=-1}^{1}\sum_{k=-1}^{1} W[k,m]}$$

wherein $W[k,m] = f(|S[i,j] - S[i+k,j+m]|)$.

Figure 7:
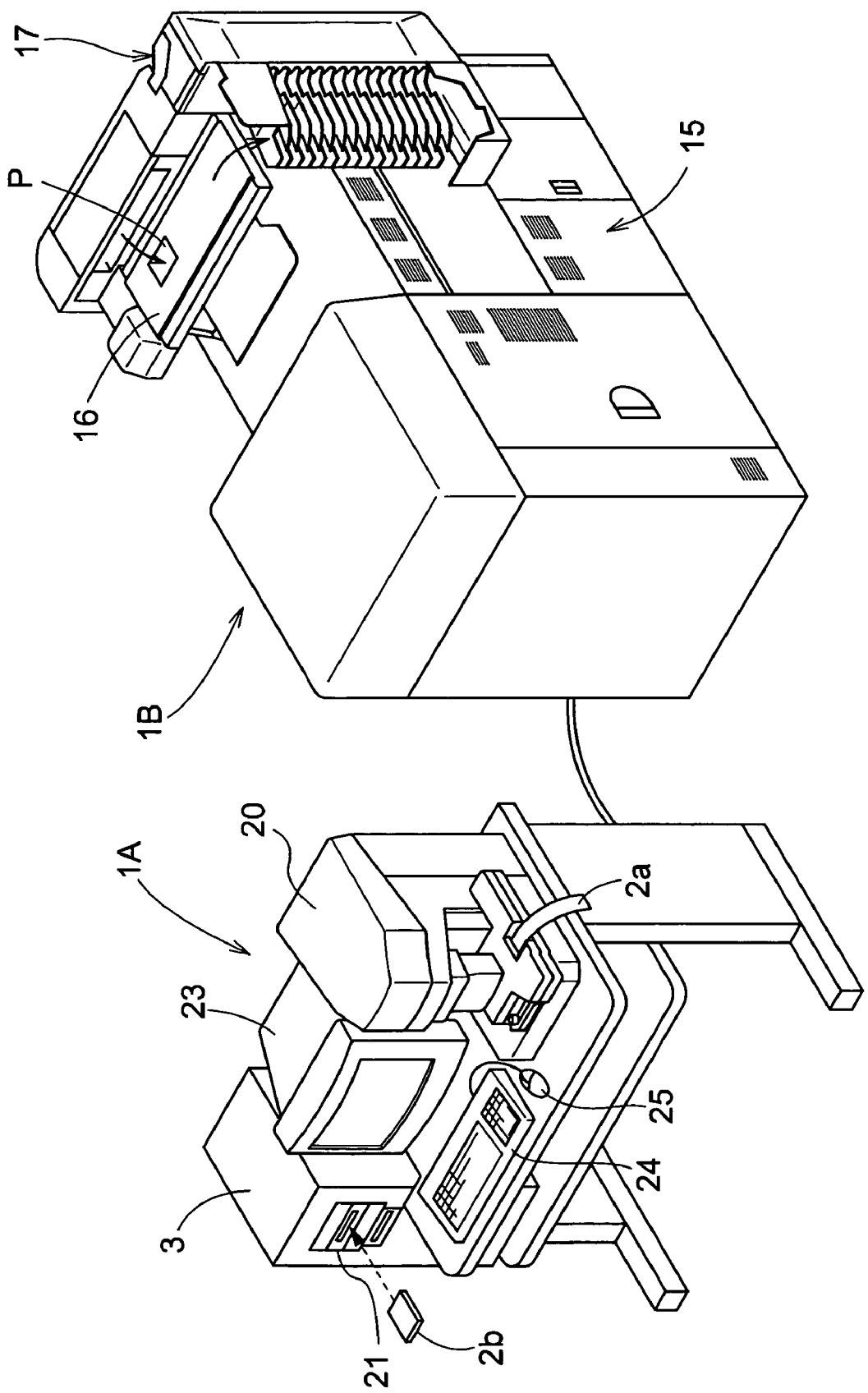
FIG. 7 shows an outer appearance of a photographic printing apparatus incorporating an image processing unit using a granular noise restricting module of the present invention.

In accordance with an embodiment of the present invention, a photographic printing apparatus incorporates the granular noise restricting module employing the granular noise restricting image processing function described herein. FIG. 7 shows an outer appearance of the photographic printing apparatus in accordance with an exemplary embodiment of the present invention. The photographic printing apparatus comprises a print station 1B acting as a photographic printer for effecting an exposing operation and a developing operation on a print paper P, an operating station 1A for processing a photographic image inputted from an image recording medium such as a developed photographic film 2a, a memory card 2b for a digital camera and generating/forwarding the resultant printing data for use in the print station 1B.

Figure 8:
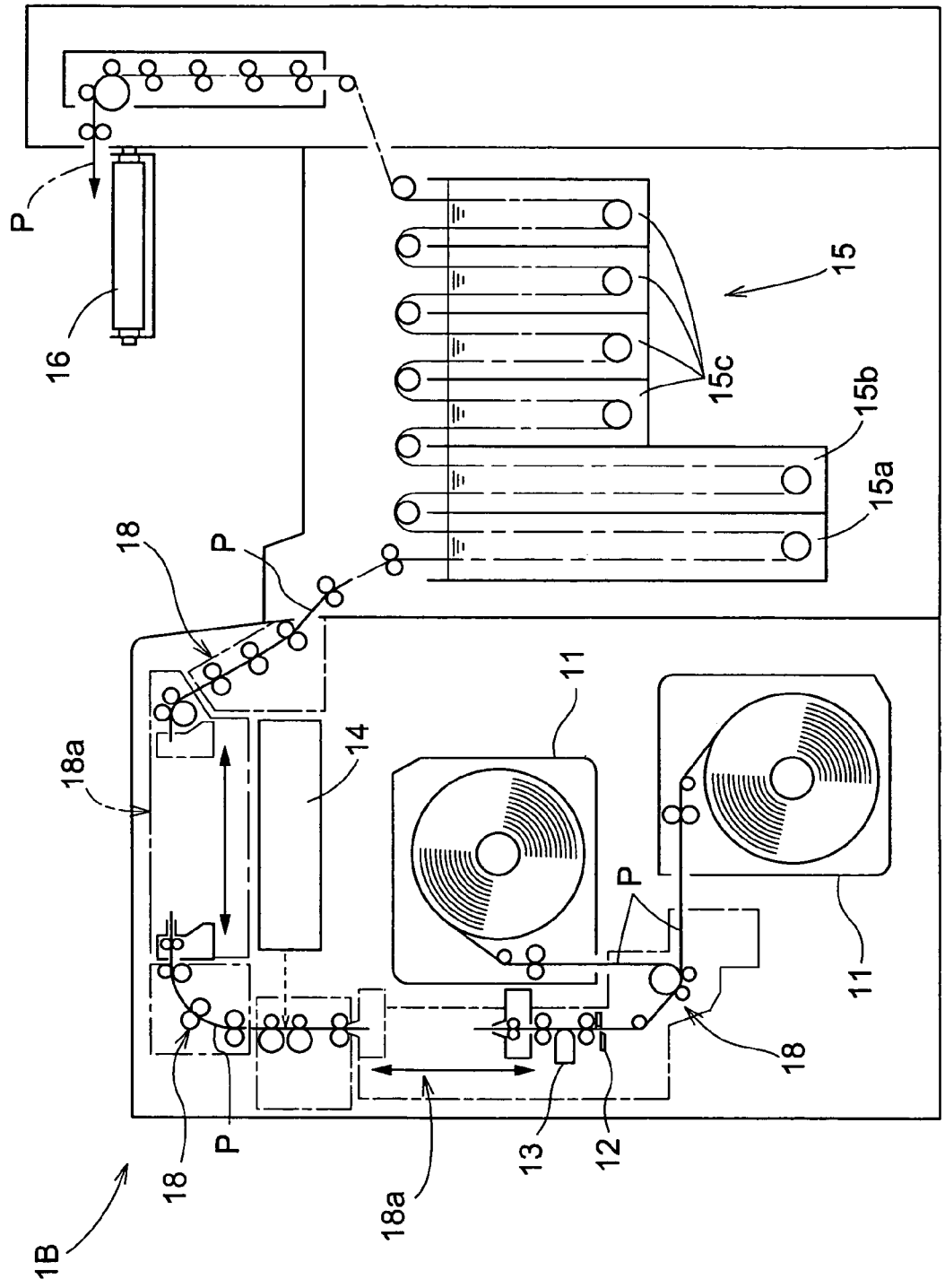
FIG. 8 is a schematic schematically showing a construction of a print station of the photographic printing apparatus.

The photographic printing apparatus of the present invention is also known as "digital mini-lab". As best understood from FIG. 8, in the print station 1B, a print paper P stored in the form of a roll in either one of two print paper magazines 11 is drawn out and cut by a sheet cutter 12 to a print size strip. On this print paper P (or print size strip), a back printing unit 13 prints on its back face, various print processing information such as color correction information, frame numbers, etc, and a print exposing unit 14 effects an image exposure on a front face of each paper P. Then, a plurality of such exposed print papers P are charged into a developing tank unit 15 having a plurality of developing solution tanks for their development. After being dried, the developed print papers P, i.e. photographic prints P, are conveyed by a transverse conveyer 16 mounted on an upper section of the apparatus to a sorter 17, which sorts the print papers P, i.e. the photographic prints P, according to each customer's order and stacked in a plurality of trays of the sorter 17 (see FIG. 7).

For transporting the print papers P at a speed adapted or suited for each of the various operations described herein, there is provided a print paper transporting mechanism 18. The print paper transporting mechanism 18 has a plurality of pinch transport roller pairs comprising chucker type print paper transport units 18a disposed before and after the print exposing unit 14 relative to the print paper transporting direction.

The print exposing unit 14 has line exposure heads for effecting irradiation of laser beams of three primary colors, R (red), G (green) and B (blue) along a main scanning direction of the print paper P, which is being transported in a sub scanning direction based on the print data sent from the operating station 1A. The developing solution tank unit 15 comprises a color developing solution tank 15a that stores therein color developing solution therein, a bleaching/fixing solution tank 15b that stores therein bleaching/fixing solution therein and stabilizing solution tanks 15c, which store stabilizing solutions therein.

At an upper position of a desk-like console of the operating station 1A, there is disposed a film scanner 20 capable of obtaining photographic image data (referred to simply as "image data" hereinafter) with resolution exceeding 2000 dpi from the respective photographically exposed frame of the photographic film 2a. Whereas, a media reader 21 for obtaining photographic images from various types of semiconductor memories, CD-R or the like used as photographic image recording media 2b mounted on a digital camera or the like is incorporated within a general-purpose personal computer which, in this embodiment, functions as a controller 3 for the photographic printing apparatus. The general-purpose PC is connected also to a monitor 23 for displaying various kinds of information, a keyboard 24 and a mouse 25 which function as input devices for effecting various settings or adjustments.

Figure 9:
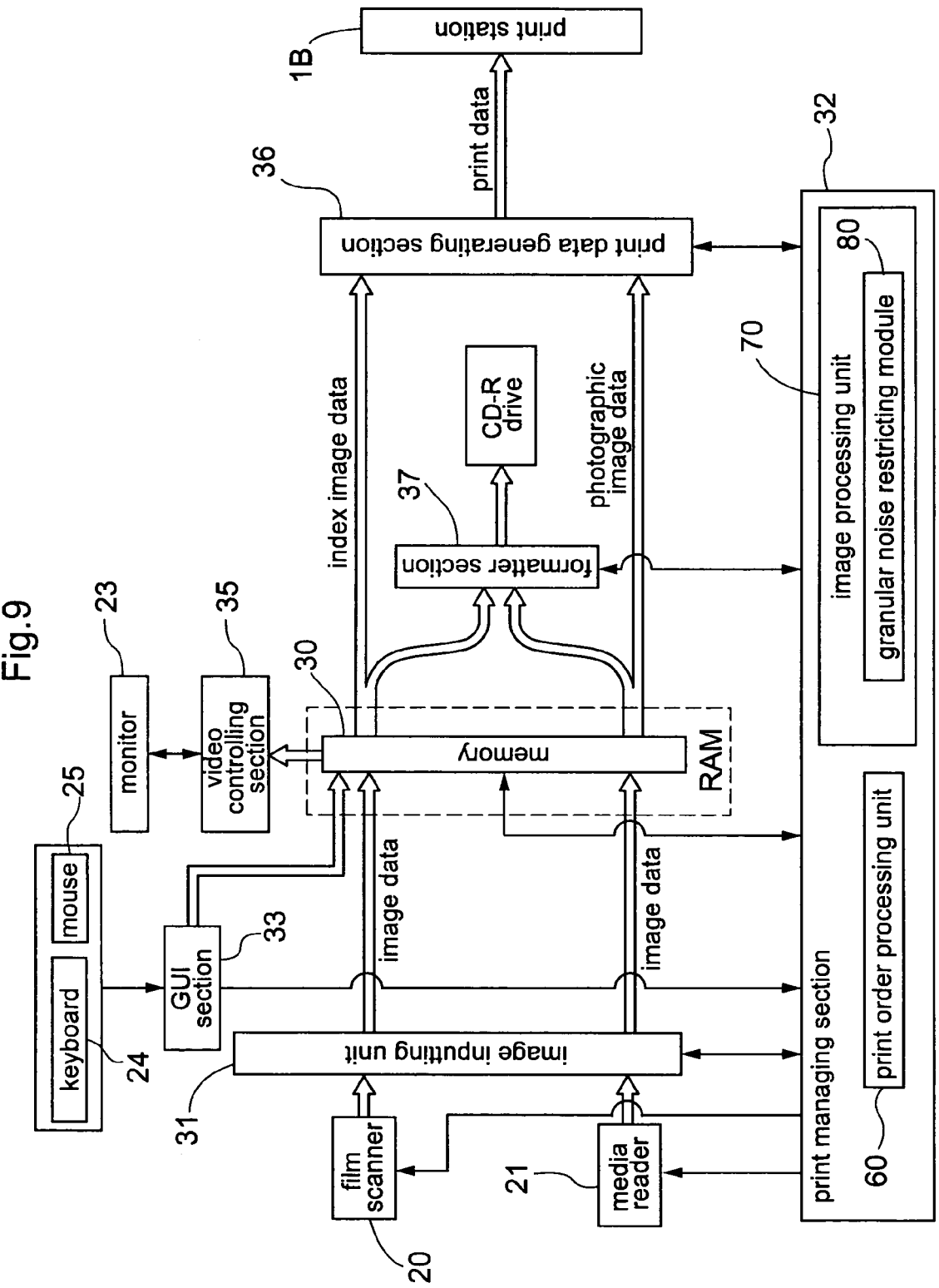
FIG. 9 is a functional block diagram for illustrating functional components incorporated within a controller of the photographic printing apparatus.

The controller 3 of the photographic printing apparatus comprises a CPU as a core component thereof and various functional units or sections, in the form of hardware and/or software, for carrying out various operations of the photographic printing apparatus. With reference to FIG. 9, some of the functional units thereof particularly pertinent to the technique of the present invention will be described herein. An image inputting unit 31 effects a preprocessing required for subsequent processing on each photographic image obtained by the film scanner 20 or the media reader 21. A GUI section 33 constitutes a graphic user interface (i.e. GUI) configured for creating a graphically assisted operation screen having various windows, various operation buttons or the like and generating control commands from user's operational inputs (via the keyboard 24, the mouse 25 or the like) effected through such graphic operation screen. For example, a print managing section 32 effects an image processing operation on the image data transmitted from the image inputting section 31 to a memory 30, thereby generating the desired print data according to a control command sent from the GUI section 33 or an operation command directly inputted via e.g. the keyboard 24. A video controlling section 35 generates video signals for causing the monitor 32 to display a print source image or a simulated image as an expected finished print image during a pre-judge printing operation, e.g., color correction, and to display the graphic data sent from the GUI section 33. A print data generating section 36 generates print data suited for the print exposing unit 14 mounted in the print station 1B, based on final image data. A formatter section 37 formats raw image data or the finally processed image data into a format writable, e.g., in a CD-R, in accordance with a customer's request.

Referring more particularly to the image inputting section 31, where the photographic image recording media is a film 2a, the image inputting section 31 transmits scanned data scanned in a pre-scanning mode and a main scanning mode, separately to the memory 30, to effect a preparatory operation suited for each particular purpose. Whereas the photographic image recording media is a memory card 2b and the inputted image data contains thumbnail image data (low resolution data), the image inputting section 31 transmits the thumbnail data to the memory 30 separately from the main data (high resolution data) of the photographic image. For example, this enables the thumbnail data to be displayed on the monitor 23 as a list or summary. On the other hand, if no thumbnail data are contained therein, the image inputting section 31 generates reduced images from the main data and sent these reduced images as thumbnail data to the memory 30.

The print managing section 32 comprises a print order processing unit 60 for managing the print size, the number of prints, etc. and an image processing unit 70 for effecting various image processing operations on the image data mapped in the memory 30.

Figure 10:
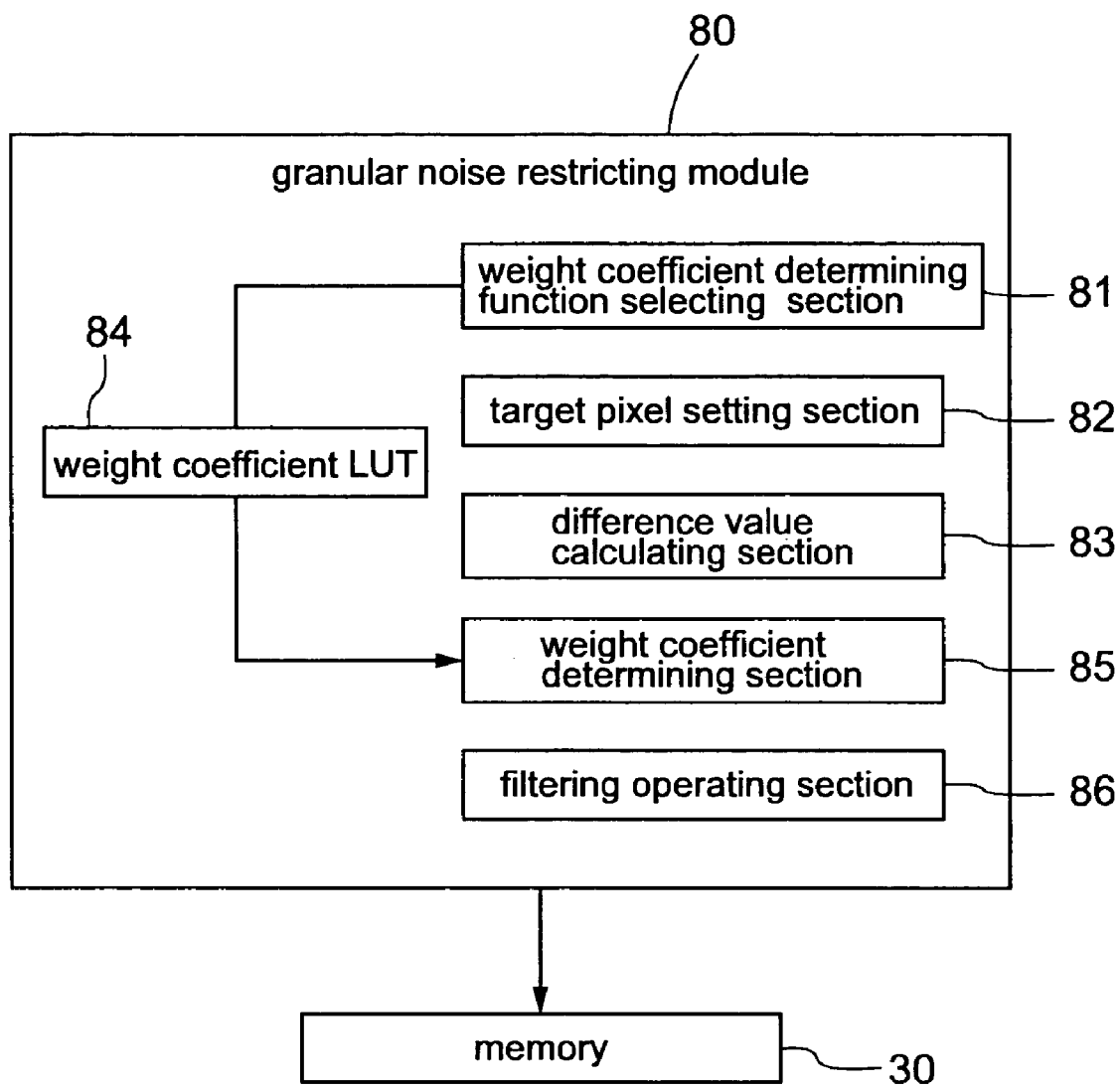
FIG. 10 is a functional block diagram showing functional blocks of the granular noise restricting module.

In accordance with an embodiment of the present invention, the image processing unit 70 comprises a granular noise restricting module 80 employing the techniques of the present invention and means for realizing other photo retouching functions. The granular noise restricting module 80 is incorporated substantially in the form of a program in the image processing unit 70. More particularly, as shown in FIG. 10, the granular noise restricting module 80 comprises a weight coefficient determining function selecting section 81, a target pixel setting section 82, a difference value calculating section 83, a weight coefficient determining section 85 and a filtering operating section 86. The weight coefficient determining function selecting section 81 selects and sets a weight coefficient determining function for use in a granular noise restricting filtering operation either automatically depending on the resolution employed by the film scanner 20 when obtaining the image data or the type of the film or in response to an operator's manual operation. The target pixel setting section 82 sets one target pixel after another from a group of pixels together constituting the photographic image data mapped in the memory 30. The difference value calculating section 83 calculates a difference value between a pixel value of each target pixel and each peripheral pixel present within a calculating area centering about the target pixel and used for a weighted average filter. The weight coefficient determining section 85 reads from a weight coefficient LUT 84, a lookup table for the weight coefficient determining function selected by the weight coefficient determining function selecting section 81 and then determines a weight coefficient for each calculation pixel with using this lockup table. The filtering operating section 86 obtains a corrected pixel value for the target pixel by effecting the weighted average filtering operation with using the determined weight coefficient as the operator. It is appreciated that the weight coefficient determining function selecting section 81 can be omitted by specifying the weight coefficient determining function to be used in advance.

In accordance with an exemplary embodiment of the present invention, the flow of the granular noise restricting image processing operation by the granular noise restricting module 80 is now described herein. If the image data comprise color image data, in each pixel, each color component thereof such as R, G, B has a certain density value of its own. Hence, the weighted average filtering operation is needed for each color component. For the simplicity of explanation, however, the following discussion herein will be made as a process for a certain particular color component.

Figure 11:
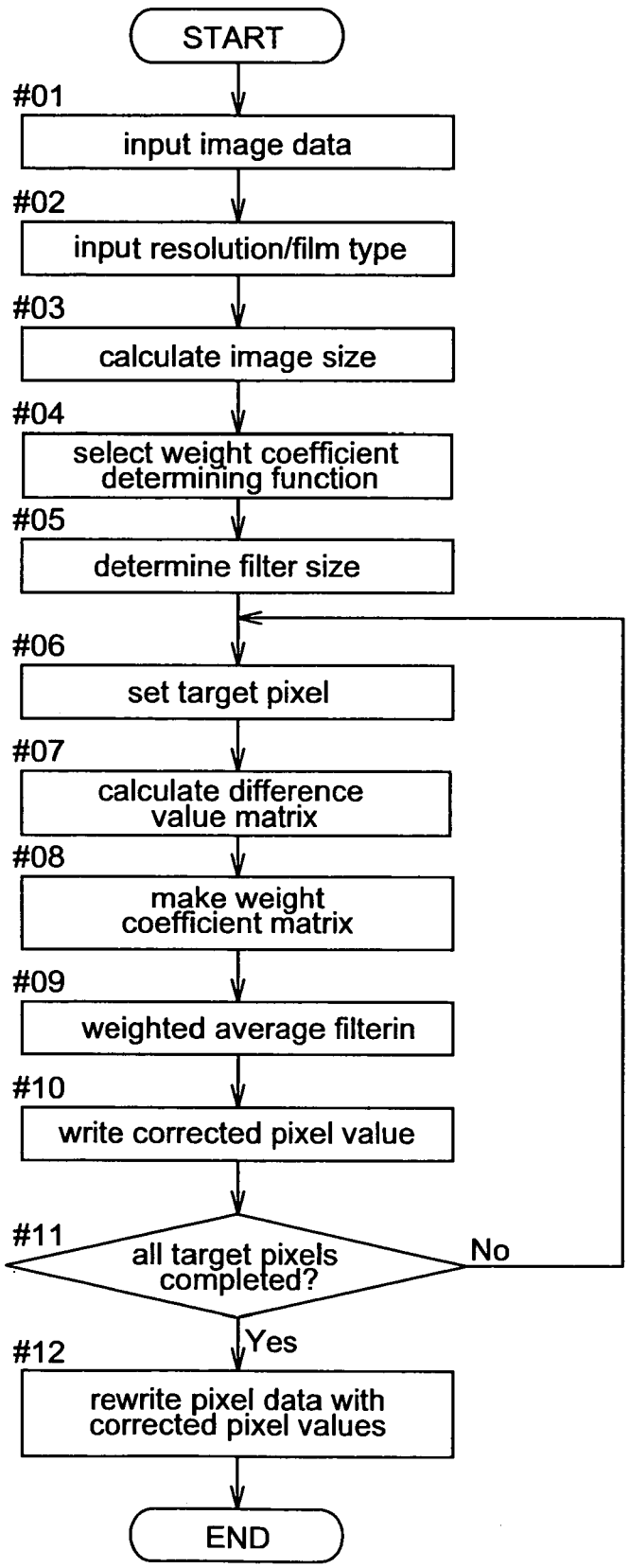
FIG. 11 is a flowchart illustrating a process of a weighted average filtering operation for granular noise restriction.

The flow of the image processing in accordance with an exemplary embodiment of the present invention is illustrated in FIG. 11. The image data are inputted via the film scanner 20, the media reader 21 or the like and mapped in the memory 30 in step 1. As initial setting operations, if the image data have been inputted via the film scanner 20, the resolution employed in this input operation or the type of the film is inputted automatically or manually in step 2 and the aspect ratio of the image data mapped in the memory 30 is calculated in advance in step 3. Further, where the granular noise restricting module 80 comprises the weight coefficient determining function selecting section 81, then a weight coefficient determining function to be employed is selected in advance by the automated analysis of the photographic image information or in response to an operator's input in step 4.

Alternatively, the step 4 can be omitted if the weight coefficient determining function selecting section 81 is absent. Further, the size of the filter can be determined or selected and set depending on the photographic image information such as the image data size in step 5. The filter size can generally be in the range from 3×3 to 13×13. Upon completion of the preprocessing operations as described herein, the following main processing can be initiated.

The target pixel setting section 82 sets one target pixel after another from the image data mapped in the memory 30 in step 6. Based on the matrix position of each set target pixel, the difference value calculating section 83 calculates a difference value matrix in step 7. From the difference value matrix obtained, the weight coefficient determining section 85 generates a weight coefficient matrix by using a lookup table designated in the weight coefficient LUT 84 in step 8. In accordance with an embodiment of the present invention, the relation equation for use in determining the weight coefficient is:

$$W = (|\Delta d|/SH)^{15}$$

where, W is a weight coefficient, $\Delta d$ is a difference value and SH is a threshold value SH=16. The weight coefficient determining relation equation can be represented by a graph such as FIG. 2. Therefore, the lookup table designated here is representation of this relation equation in the form of lookup table.

Upon generation of the weight coefficient matrix, the filtering operating section 86 effects a weighted average filtering operation using this weight coefficient matrix as the operator and the result of this calculation is set as a corrected pixel value, i.e., a granular noise corrected pixel value of the target pixel in step 9. The obtained corrected pixel value is then stored at an address in a corrected image data storing area within the memory 30 at an address thereof corresponding to the coordinate position of this particular target pixel in step 10.

If the inquiry of step 11 is answered in negative, then the operations of steps 6-10 are repeated until all pixels constituting the inputted image data as the source image data mapped in the memory 30 are completed. However, if the inquiry of step 11 is answered in the affirmative (i.e., upon completion of calculations of the corrected pixel values of all pixels and storage thereof in the corrected image data area), the initially inputted pixel values of the image data are rewritten by the respective corrected pixel values stored in the corrected image data storing area in step 12, thus completing the granular noise restricting operation. For image data comprising color image data, the operations of steps 6-12 can be effected for each color component (R, G, B, etc.) and color image data mapped in the memory 30 is rewritten with the corrected pixel values of each color component.

It is appreciated that the weighted average filtering calculation need not necessarily be affected for all pixels as the calculation target pixels. Instead, for example, this calculation can be effected on every other pixel so as to increase the processing speed.

The granular noise restricting image processing technique of the present invention is most effective for processing image obtained by a film scanner from a photographic film. However, since granular noise is similar to CCD noise, the technique of the present invention is effective also for image data obtained by an image pickup apparatus using CCD image pickup devices such as a digital camera. Therefore, the present invention does not exclude granular noise restricting operations on such image data. And, in the context of the present invention, the term "photographic image data" is used generically, including not only photographic image data obtained by a camera, but also photograph-like image data created by CG technique or the like.

Further, in the foregoing embodiment, the granular noise restricting image processing technique of the present invention is employed in the so-called silver salt photographic printing apparatus wherein the print paper P is subjected to an exposure of photographic images by the print exposing unit 14 having an exposure engine and the exposed print paper P is then subjected to a plurality of stages of developing operations. It is appreciated that the technique of the present invention can be employed in photographic printing apparatuses of various other types using e.g. an ink jet printing technique for jetting ink onto a film or paper for forming an image thereon or heat transfer printing technique using a thermal transfer sheet.

The invention claimed is:

1. An image processing method for restricting granular noise present in photographic image data obtained by digitization of an image by a weighted average filtering operation, the method comprising the steps of:

setting one target pixel after another from a group of pixels together constituting said photographic image data stored in a memory by target pixel setting section of image processing unit;

calculating a difference value between a pixel value of said target pixel and each peripheral pixel present within a calculating area centering about said target pixel and used for the weighted average filtering operation by a difference value calculation section of said image processing unit;

determining a weight coefficient for use in the weighted average filtering operation in accordance with said difference value by a weight coefficient determining section of said image processing unit;

said weight coefficient having a defined range from 0 to 1, being set to 1 when said difference value is 0, being selected from a group of values wherein said weight coefficient is set to decrease monotonously from 1 with increasing absolute value of said difference value and then increase monotonously to 1 when said difference value is greater than 0 and smaller than a predetermined threshold value, and being set to 0 or being selected from a group of values wherein said weight coefficient is set to decrease monotonously from 1 with increasing absolute value of said difference value when absolute value of said difference value is equal to or greater than said threshold;

obtaining a corrected pixel value for said target pixel by effecting the weighted average filtering operation with using weight coefficient by filtering operation section of said image processing unit; and storing said corrected pixel value in said memory by said image processing unit.

2. The method of claim 1, further comprising the step of calculating said weight coefficient based on the following relation equation:

$$W=(|\Delta d|/SH)^n$$

where, $n \geq 1$, W is said weight coefficient, $\Delta d$ is said difference value and SH is said threshold value.

3. The method of claim 1, further comprising the step of calculating said threshold value based on statistical characteristics value of all pixel values of said photographic image data.

4. The method of claim 1, further comprising the steps of dividing said photographic image data into a plurality of pixel areas and calculating said threshold value for each pixel area based on statistical characteristics value of pixel values of said each pixel area, such that a different threshold value is employed for each pixel area including said target pixel.

5. The method of claim 2, wherein the step of calculating calculates said weight coefficient based on said relation equation, where n=15 and SH=16.

6. The method of claim 1, wherein the steps of setting, calculating, determining, obtaining and storing are computer executable instructions for causing a computer to execute the steps of setting, calculating, determining, obtaining and storing.

7. A computer readable medium comprising a code for restricting granular noise present in photographic image data, said code comprising computer executable instructions for:

setting one target pixel after another from a group of pixels together constituting photographic image data obtained by digitization of an image by a weighted filtering operation;

calculating a difference value between a pixel value of said target pixel and each peripheral pixel present within a calculating area centering about said target pixel and used for the weighted average filtering operation;

determining a weight coefficient for use in the weighted average filtering operation in accordance with said difference value, said weight coefficient having a defined range from 0 to 1, being set to 1 when said difference value is 0, being selected from a group of values wherein said weight coefficient is set to decrease monotonously from 1 with increasing absolute value of said difference value and then increase monotonously to 1 when said difference value is greater than 0 and smaller than a predetermined threshold value, and being set to 0 or being selected from a group of values wherein said weight coefficient is set to decrease monotonously from 1 with increasing absolute value of said difference value when absolute value of said difference value is equal to or greater than said threshold;

obtaining a corrected pixel value for said target pixel by effecting the weighted average filtering operation with said weight coefficient; and storing said corrected pixel value in a memory.

8. Apparatus for restricting granular noise present in photographic image data obtained by digitization of an image by a weighted average filtering operation, comprising:

a memory for storing said photographic image data obtained by digitization of said image; and an image processing unit comprising:

a target pixel setting section for setting one target pixel after another from a group of pixels together constituting said photographic image data stored in said memory;

a difference value calculating section for calculating a difference value between a pixel value of said target pixel and each peripheral pixel present within a calculating area centering about said target pixel and used for the weighted average filtering operation;

a weight coefficient determining section for determining a weight coefficient for use in the weighted average filtering operation in accordance with said difference value, said weight coefficient having a defined range from 0 to 1, being set to 1 when said difference value is 0, being selected from a group of values wherein said weight coefficient is set to decrease monotonously from 1 with increasing absolute value of said difference value and then increase monotonously to 1 when said difference value is greater than 0 and smaller than a predetermined threshold value, and being set to 0 or being selected from a group of values wherein said weight coefficient is set to decrease monotonously from 1 with increasing absolute value of said difference value when absolute value of said difference value is equal to or greater than said threshold;

a filtering operating section for obtaining a corrected pixel value for said target pixel by effecting the weighted average filtering operation with said weight coefficient; and wherein said image processing unit is operable to store said corrected pixel value in said memory.

9. The apparatus of claim 8, further comprising a lookup table from which each weight coefficient is extracted in accordance with said difference value.

10. The apparatus of claim 8, wherein said weight coefficient determination section is operable to calculate said weight coefficient based on the following relation equation:

$$W=(|\Delta d|/SH)^n$$

where, $n \geq 1$, W is said weight coefficient, $\Delta d$ is said difference value and SH is said threshold value.

11. The apparatus of claim 10, wherein said weight coefficient determination section is operable to calculate said weight coefficient based on said relation equation, where n=15 and SH=16.

12. The apparatus of claim 8, wherein said target pixel setting section is operable to divide said photographic image data into a plurality of pixel areas and wherein said difference value calculates section is operable to calculate said threshold value for each pixel area based on statistical characteristics value of pixel values of said each pixel area, such that a different threshold value is employed for each pixel area including said target pixel.

* * * * *

UNITED STATES PATENT AND TRADEMARK OFFICE
CERTIFICATE OF CORRECTION

PATENT NO. : 7,643,696 B2  
APPLICATION NO. : 11/409204  
DATED : January 5, 2010  
INVENTOR(S) : Koji Kita Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Twenty-first Day of December, 2010

David J. Kappos  
*Director of the United States Patent and Trademark Office*